United States Patent
Ravindran et al.

(10) Patent No.: US 9,838,333 B2
(45) Date of Patent: Dec. 5, 2017

(54) SOFTWARE-DEFINED INFORMATION CENTRIC NETWORK (ICN)

(71) Applicant: Futurewei Technologies, Inc., Plano, TX (US)

(72) Inventors: Ravishankar Ravindran, San Ramon, CA (US); Guo-Qiang Wang, Santa Clara, CA (US)

(73) Assignee: Futurewei Technologies, Inc., Plano, TX (US)

(*) Notice: Subject to any disclaimer, the term of this patent is extended or adjusted under 35 U.S.C. 154(b) by 172 days.

(21) Appl. No.: 14/600,222

(22) Filed: Jan. 20, 2015

(65) Prior Publication Data
US 2016/0212066 A1 Jul. 21, 2016

(51) Int. Cl.
*H04L 12/927* (2013.01)
*H04L 12/721* (2013.01)
*H04L 12/717* (2013.01)

(52) U.S. Cl.
CPC .......... *H04L 47/80* (2013.01); *H04L 45/38* (2013.01); *H04L 45/42* (2013.01)

(58) Field of Classification Search
CPC .......... H04L 47/80; H04L 45/42; H04L 45/38
See application file for complete search history.

(56) References Cited

U.S. PATENT DOCUMENTS

| | | | |
|---|---|---|---|
| 7,152,103 B1* | 12/2006 | Ryan | H04L 63/00 709/224 |
| 8,667,172 B2 | 3/2014 | Ravindran et al. | |
| 2009/0138577 A1* | 5/2009 | Casado | H04L 41/06 709/220 |
| 2011/0273988 A1* | 11/2011 | Tourrilhes | H04L 41/0816 370/237 |
| 2013/0332619 A1* | 12/2013 | Xie | H04L 67/2823 709/230 |
| 2014/0019443 A1* | 1/2014 | Golshan | G06F 17/30867 707/723 |
| 2014/0173018 A1* | 6/2014 | Westphal | H04L 41/0823 709/213 |
| 2014/0192717 A1* | 7/2014 | Liu | H04W 60/00 370/328 |

* cited by examiner

*Primary Examiner* — Noel Beharry
*Assistant Examiner* — Ruihua Zhang
(74) *Attorney, Agent, or Firm* — Conley Rose, P.C.

(57) ABSTRACT

A network element (NE) comprising a receiver configured to receive a flow configuration message from a network controller via an information centric network (ICN), wherein the flow configuration message comprises a flow entry that identifies a flow in the ICN, wherein the flow is associated with a name of an application data object, and wherein the flow entry comprises a forwarding path associated with an application corresponding to the application data object name, and receive a packet, via the ICN, comprising the application data object name, a processor coupled to the receiver and configured to select the flow entry from a flow table based on the packet's application data object name, and a transmitter coupled to the processor and configured to forward the packet along the forwarding path in the selected flow entry.

20 Claims, 7 Drawing Sheets

SOFTWARE-DEFINED INFORMATION CENTRIC NETWORK (ICN)

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Software defined networking (SDN) is a networking architecture in which data forwarding (e.g., data plane) is decoupled from control decisions (e.g., control plane) such as routing and resource management functionalities. The decoupling allows the data plane and the control plane to operate on different hardware, in different runtime environments, and/or operate using different models. As such, SDN enables the underlying network infrastructure to be abstracted for applications and network services, treating the network as a logical entity. SDN-based technologies are mostly applied for defining and configuring transport networks and transport data flows that are limited to Open Systems Interconnect (OSI) layer two (L2), OSI layer three (L3), and/or OSI layer four (L4).

SUMMARY

In one embodiment, the disclosure includes a network controller comprising a processor configured to identify a flow between a network switch and an application in an information centric network (ICN) according to an application-specific objective, wherein the application is associated with an application name, and generate a flow entry that comprises an identifier of the flow in association with the application name, and a transmitter coupled to the processor and configured to send a flow configuration message to the network switch via the ICN, wherein the flow configuration message comprises the flow entry.

In another embodiment, the disclosure includes a network element (NE) comprising a receiver configured to receive a flow configuration message from a network controller via an ICN, wherein the flow configuration message comprises a flow entry that identifies a flow in the ICN, wherein the flow is associated with a name of an application data object, and wherein the flow entry comprises a forwarding path associated with an application corresponding to the application data object name, and receive a packet, via the ICN, comprising the application data object name, a processor coupled to the receiver and configured to select the flow entry from a flow table based on the packet's application data object name, and a transmitter coupled to the processor and configured to forward the packet along the forwarding path in the selected flow entry.

In yet another embodiment, the disclosure includes a method implemented in a network switch comprising receiving a flow configuration message from a network controller via an ICN, wherein the flow configuration message comprises a flow entry that identifies a flow in the ICN, wherein the flow is associated with a name of an application data object, and wherein the flow entry comprises a forwarding path towards an application corresponding to the application data object name, receiving an interest packet, via the ICN, comprising the application data object name, selecting the flow entry from a flow table based on the application data object name, and forwarding the interest packet towards the application along the forwarding path in the selected flow entry.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
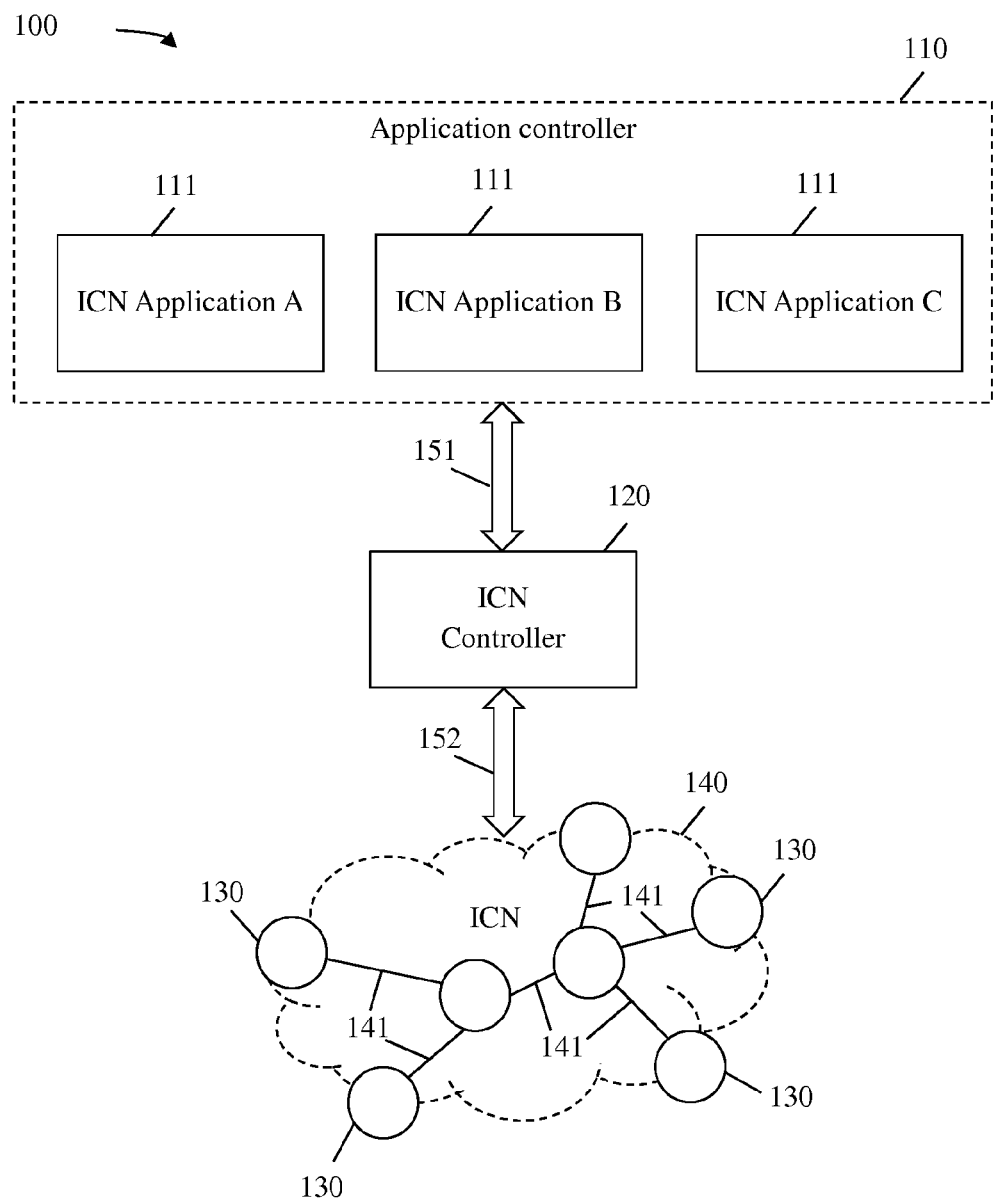
FIG. 1 is a schematic diagram of an embodiment of a software-defined ICN architecture.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

An ICN is a type of network architecture that focuses on information delivery. ICNs may also be known as content-aware, content-centric, or data specific networks. ICNs shift the Internet protocol (IP) communication model from a host-to-host model to an information-object-to-object model. The IP host-to-host model addresses and identifies data by storage location, for example, by host IP address, whereas the information-object-to-object model employs a non-location based addressing scheme that is content-based. The entities that are distributed or operated on in an ICN communication model are information objects. Some examples of information objects may include content, data streams, services, user entities, and/or devices. In an ICN, information objects are assigned with application-based names, which are used to address the information objects, decoupling the information objects from locations. Routing to and from the information objects are based on the assigned names. ICN provisions for in-network caching, where a wide variety of network devices or elements serve as temporary content server (CS). For example, ICN nodes may maintain pending interest tables (PITs), forwarding information bases (FIBs), and CSs for data forwarding.

Disclosed herein are embodiments of a software-defined ICN architecture that provides a service-centric, application-driven network by leveraging ICN protocol and extending SDN architecture into OSI layer 7, which is referred to herein as the application layer. The disclosed software-defined ICN architecture comprises an application controller, an ICN controller, and a plurality of software-defined ICN switches. The application controller comprises a plurality of applications that deliver services and/or content over an ICN. The application controller provides the ICN controller with application-specific objectives, which may be associated with security, context, policies, and/or content caching. For example, the application controller may specify how a user should connect to an application and/or indicating which users have permissions to connect to the application. The ICN controller identifies application flows in the ICN based on the application-specific objectives, where the application flows are associated with name-based identifiers. To identify an application flow, the ICN controller generates flow rules by computing forwarding paths and identifying service controls based on the application-specific objectives. After identifying the application flow, the ICN controller adds a flow entry comprising the flow rules for the application flow in each of the ICN switches along the forwarding path. The ICN switches manage application flow tables, in which the entries are populated by the ICN controller. When an ICN switch receives a packet, the ICN switch performs flow matching to find a flow entry in the application flow table that matches the fields of the received packet. When a match is found, the ICN switch applies the flow rules stored in the matching flow entry to the received packet. In addition to packet forwarding and processing, the ICN switches measure application-specific and/or business-specific statistics, such as content popularity, service popularity, content provider popularity, and/or service provider popularity, and monitor context changes. As such, the disclosed software-defined ICN architecture dynamically adapts to context, user interests, and/or applications, and thus provides improved content and/or service delivery.

In contrast to some embodiments of SDN-based technologies, the disclosed software-defined ICN architecture identifies application flows based on application-specific objectives instead of transport data flows based on network requirements and/or network behaviors. The disclosed ICN further associates application flows with name-based identifiers instead of location-based identifiers. In some embodiments, location semantics may be appended to ICN packets when flow rules operate on location information. Finally, the disclosed ICN measures application-specific statistics and/or metrics, such as popularity measures, instead of transport level statistics and/or metrics, such as the number of packets or the packet queue sizes. In contrast to some ICN embodiments, the disclosed software-defined ICN switches forward and process data according to application flow rules identified by an ICN controller and driven by an application controller in addition to ICN protocol forwarding components, such as PIT, FIB, and CSs.

FIG. 1 is a schematic diagram of an embodiment of a software-defined ICN architecture 100. The software-defined ICN architecture 100 comprises an application controller 110, an ICN controller 120, and an ICN 140. The ICN 140 comprises a plurality of software-defined ICN switches 130 and or other network elements interconnected by a plurality of links 141. The ICN 140 transports data by employing ICN protocol primitives, such as an interest primitive and a data primitive, that act on the names of the data. The ICN 140 provides in-network caching, built-in content security, and multi-cast data distributions according to the ICN protocol. The ICN 140 may comprise one or more networking domains that are operated by one or more administrative domains. The links 141 may comprise physical links, such as fiber optic links, electrical links, wireless links, and/or logical links used to transport data in the ICN 140.

The application controller 110 may be one or more devices and/or virtual machines (VMs) configured to execute a plurality of applications 111 (e.g., ICN Applications A, B, and C) that provide services and/or content over the ICN 140. The application controller 110 is an aggregated logical entity of the applications 111. The services and/or content may include real time applications, such as conferencing services and white boarding services, and/or nonreal time applications, such as video-on-demand (VoD), machine-to-machine (M2M) services, and vehicle-to-vehicle (V2V) analytics. Each application 111 operates with a set of application-specific objectives, which may include security controls, contextual information, service policies, access control policies, reliabilities, latencies, and/or costs. Contextual information may include social, grouping, and/or location type of network ecosystem information, where a network ecosystem may be associated with a home network, a smart grid network, a transportation network, a social network, etc. In addition, contextual information may include users' device capabilities, application capabilities, and/or service capabilities. The application controller 110 may maintain a plurality of application profiles corresponding to the application-specific objectives of the applications 111. Based on the application profiles, the application controller 110 instructs the ICN controller 120 to configure the ICN 140 to achieve the application-specific objectives. For example, the application controller 110 may provide data indicating how a user should connect to an application 111 and/or indicating which users have permission to connect to the application 111 based on the associated policies. The application controller 110 sends the application-specific objectives in an application control message to the ICN controller 120 via an application control interface 151.

The ICN controller 120 may be any device configured to manage and/or control the ICN 140. The ICN controller 120 may be physically or logically located within the ICN 140. In an embodiment, the ICN controller 120 may be a centralized logical entity distributed across one or more NEs. In another embodiment, the ICN controller 120 may be implemented as a network control module within a VM. The ICN controller 120 performs a variety of network control functions according to the application-specific objectives. Some examples of network control functions may include, but are not limited to, generating and maintaining network topologies, identifying application flows, and managing network resources and network state information.

To identify an application flow in the ICN 140 for delivering a service or a content associated with an application 111, the ICN controller 120 generates flow rules by computing one or more forwarding paths through the ICN 140 and identifying service controls based on the application-specific objectives associated with the application 111. Some examples of service controls may include security verifications and enforcements, context adaptations, content caching, policy enforcements, etc. After identifying the application flow, the ICN controller 120 generates a flow entry based on the flow rules and adds the flow entry in each of the ICN switches 130 along the forwarding path, for example, by sending the flow entry in a flow configuration message via a network control interface 152. The flow entry is associated with a name-based identifier that identifies the application flow. For example, the name-based identifier may comprise an application name, a service name, or a content name and may comprise a hierarchical name structure (e.g., /content_provider-X/video-Y/segment-Z or /smartgrid/service-X).

The ICN controller 120 builds and maintains a global network topology view of the ICN 140 based on the application flows identified in the ICN 140, where the global network topology view is an abstracted view of the underlying infrastructure of the ICN 140. For example, the global network topology view may include network resources, (e.g., bandwidth usage, bandwidth availability, and/or latencies), network statistics, and/or application statistics in addition to network connectivity information (e.g., interconnecting NEs and/or links). The ICN controller 120 provides the application controller 110 with the global network topology view, for example, by sending the global network topology view in a network control message to the application controller 110 via the application control interface 151. In some embodiments, the application controller 110 may make decisions, such as modifying an existing application-specific objective, and/or selecting a particular route, based on the global network topology view.

The ICN controller 120 adapts to changes in the applications 111, user interests, and/or network conditions in real time by dynamically adding one or more additional flow entries, deleting one or more existing flow entries, and/or modifying one or more existing flow entries in the ICN switches 130 in response to the changes.

The ICN switches 130 may be any physical devices, such as routers and/or network switches, or logical devices configured to perform switching functions in the ICN 140 as directed by the ICN controller 140. The ICN switches 130 receive flow entries from the ICN controller 120, where the flow entries provide flow rules, such as forwarding paths and service controls, for application flows in the ICN 140. For example, the ICN switches 130 store the flow entries in one or more application flow tables and organize the application flow tables according to packet types (e.g., interest or data), application types (e.g., content or service), or finer granularities to enable efficient table look up. The switching functions include matching incoming packets to an application flow by looking up flow entries stored in the application flow table, applying flow rules to the incoming packets, measuring statistics, and monitoring context changes.

When an ICN switch 130 receives a packet, the ICN switch 130 performs flow matching to determine whether the received packet matches to a flow entry in the application flow table, for example, by comparing the packet fields carried in the packet against the flow entries. When a match is found, the ICN switch 130 applies the flow rules in the matching flow entry to the packet. For example, the ICN switch 130 may forward the packet and/or perform service control functions, such as security verifications, context adaptations, caching, policy enforcements, and/or other services. When a match is not found, the ICN switch 130 forwards the received packet to the ICN controller 120. For example, the ICN controller 120 may identify a flow for the received packet and configured the ICN switches 130 along the forwarding path with the flow. Alternatively, the ICN controller 120 may request the ICN switch 130 to discard the received packet.

The ICN switches 130 measure and track flow statistics as packets arrived at the ICN switch 130. For example, the flow statistics may be application-specific statistics, such as service popularity or content popularity, or business-specific, such as service provider popularity or content provider popularity. Service popularity refers to the number of requests for a particular service received from users and/or clients. Content popularity refers to the number of requests for a particular content received from users and/or clients. Service provider popularity refers to the number of users and/or clients that receive services from a particular service provider. Content provider popularity refers to the number of users and/or clients that download content via a particular content provider. The ICN switches 130 provide the measured statistics to the ICN controller 120, and the ICN controller 120 provides the statistics to the application controller 110. In an embodiment, content orchestration is determined based on a content popularity measure, a number of service instances is determined based on the service popularity measure, and business negotiations are determined based on the service provider popularity measure and/or the content provider popularity measure. For example, service providers and/or content providers may be ranked based on popularity measures and the service cost and/or the content cost may be negotiated based on the rankings. In addition, the ICN switches 130 monitor the incoming packets for context changes, where the context may include content format, device capabilities, application capabilities, and/or other changes related to the delivery of the content and/or services. Based on the context change, the ICN switches 130 may modify or perform additional services or control functions, such as context adaptations. For example, when an ICN switch 130 receives a video content for a user with a format that is not compatible with the user's device, the ICN switch 130 may perform transcoding or other adaptation functions on the video content to convert the video content to a suitable format for the user device and forward the converted content to the user device.

The application control interface 151 supports communication between the application controller 110 and the ICN controller 120 and may be implemented via a standard communication protocol with standard application programming interfaces (APIs). The network control interface 152 supports communication between the ICN controller 120 and the ICN switches 130 and may employ a standard communication protocol and/or extend a current communication protocol, such as the OpenFlow protocol.

Figure 2:
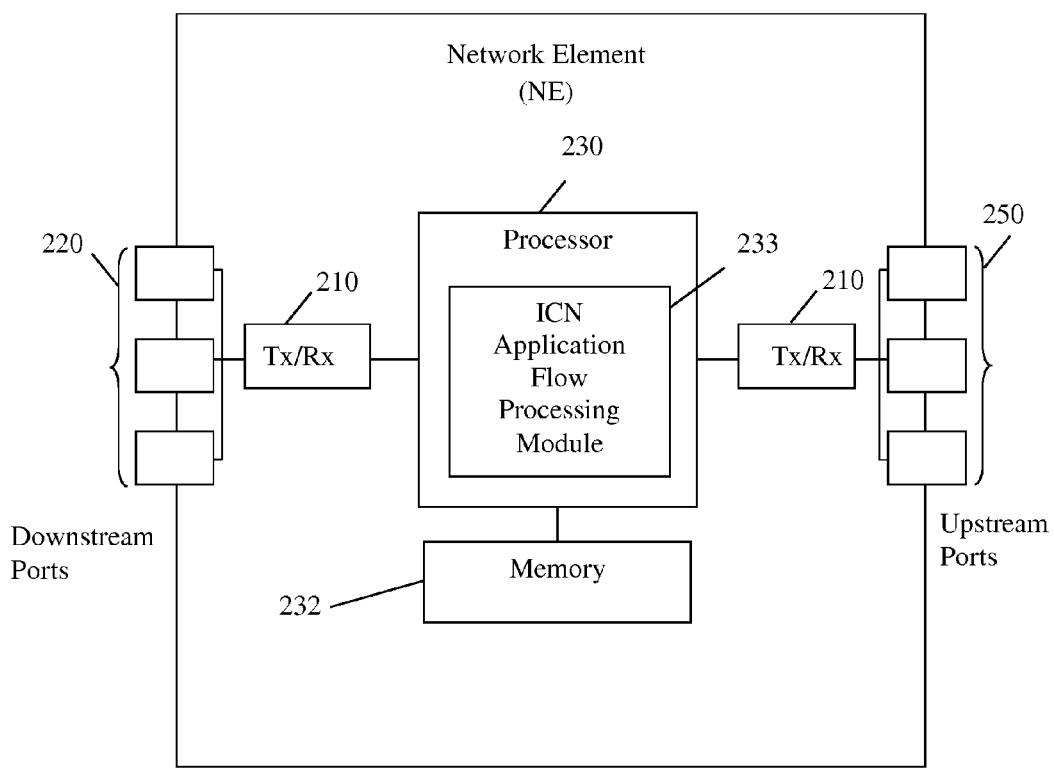
FIG. 2 is a schematic diagram of an embodiment of an NE, which may act as a node in a software-defined ICN.

FIG. 2 is a schematic diagram of an example embodiment of an NE 200, which may act as a node in a software-defined ICN, such as the ICN 140. For instance, the NE 200 may be a router and/or an ICN switch, such as the ICN switch 130, a controller, such as the ICN controller 120, and/or any network nodes in a software-defined ICN. NE 200 may be configured to implement and/or support the application flow management and/or ICN switching mechanisms described herein. NE 200 may be implemented in a single node or the functionality of NE 200 may be implemented in a plurality of nodes. One skilled in the art will recognize that the term NE encompasses a broad range of devices of which NE 200 is merely an example. NE 200 is included for purposes of clarity of discussion, but is in no way meant to limit the application of the present disclosure to a particular NE embodiment or class of NE embodiments. At least some of the features and/or methods described in the disclosure may be implemented in a network apparatus or module such as an NE 200. For instance, the features and/or methods in the disclosure may be implemented using hardware, firmware, and/or software installed to run on hardware. As shown in FIG. 2, the NE 200 may comprise transceivers (Tx/Rx) 210, which may be transmitters, receivers, or combinations thereof. A Tx/Rx 210 may be coupled to plurality of downstream ports 220 for transmitting and/or receiving frames from other nodes and a Tx/Rx 210 may be coupled to plurality of upstream ports 250 for transmitting and/or receiving frames from other nodes, respectively. A processor 230 may be coupled to the Tx/Rx 210 to process the frames and/or determine which nodes to send the frames to. The processor 230 may comprise one or more multi-core processors and/or memory devices 232, which may function as data stores, buffers, etc. Processor 230 may be implemented as a general processor or may be part of one or more application specific integrated circuits (ASICs) and/or digital signal processors (DSPs). Processor 230 may comprise an ICN application flow processing module 233, which may perform processing functions of an ICN controller 120 or an ICN switch 130 and implement methods 500, 600, and/or 700, as discussed more fully below, and/or any other method discussed herein. In an alternative embodiment, the ICN application flow processing module 233 may be implemented as instructions stored in the memory devices 232, which may be executed by the processor 230. The memory device 232 may comprise a cache for temporarily storing content, e.g., a random-access memory (RAM). Additionally, the memory device 232 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof.

It is understood that by programming and/or loading executable instructions onto the NE 200, at least one of the processor 230 and/or memory device 232 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
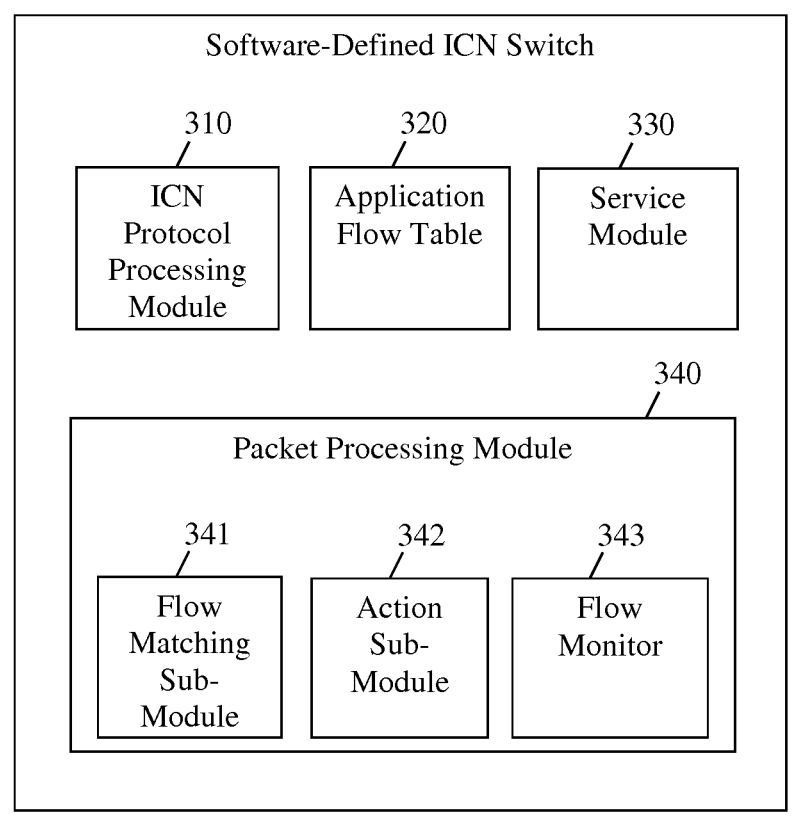
FIG. 3 is a schematic diagram of an embodiment of an architectural view of a software-defined ICN switch.

FIG. 3 is a schematic diagram of an embodiment of an architectural view of a software-defined ICN switch 300. The ICN switch 300 may be substantially similar to the ICN switch 130. The ICN switch 300 facilitates application flows in a software-defined ICN, such as the ICN 140. The ICN switch 300 comprises an ICN protocol processing module 310, an application flow table 320, a service module 330, and a packet processing module 340. The ICN protocol processing module 310 is configured to implement ICN protocol specific processing functions. For example, the ICN protocol processing module 310 may comprise one or more CSs, one or more PITs, and/or one or more FIBs to provide in-network caching, interest aggregations, and multi-cast data distribution. In addition, the ICN protocol processing module 310 may implement security functions, for example to verify data integrity, data authenticity or other credentials, according to the ICN protocol.

The application flow table 320 comprises flow rules for application flows in the ICN. The flow rules are configured by an ICN controller, such as the ICN controller 120, that controls and manages the applications in the ICN. The flow rules comprise forwarding paths and/or service control rules for the application flows. For example, the application flow table 320 may store the flow rules in a plurality of flow entries. Each flow entry is associated with a name-based identifier that corresponds to a particular application flow and may comprise one or more forwarding paths, service control rules, and/or other application-specific attributes associated with the application flow. The flow entries in the application flow table 320 may be dynamically updated as instructed by the ICN controller. For example, the application flow table 320 may add an additional flow entry, delete an existing flow entry, and/or modify an existing flow entry in real time based on the instructions provided by the ICN controller. In some embodiments, the ICN switch 300 may implement the application flow table 320 as multiple application tables to provide scalability and improve table look up efficiency.

The service module 330 is configured to provide or host one or more local services. Some examples of local services may include, but are not limited to, security functions, context adaptations, content caching, consumer policy enforcements, service policy enforcements, access control policy enforcements, etc. It should be noted that the service module 330 may provide a complete service, a portion of the service, and/or coordinate the service with the ICN protocol processing module 310, the application flow table 320, and/or the packet processing module 340.

The packet processing module 340 comprises a flow matching sub-module 341, an action sub-module 342, and a flow monitor 343. The packet processing module 340 is configured to process all incoming packets that arrive at the ICN switch 300. For example, an incoming packet is first processed by the ICN protocol processing module 310 for ICN protocol specific processing functions and then by the packet processing module 340 for switching functions. To perform the switching functions, the received packet is processed by the flow matching sub-module 341, followed by the action sub-module 342, and then the flow monitor 343.

The flow matching sub-module 341 performs flow matching to determine whether the application flow table 320 comprises a flow entry that matches the identifier and/or attributes carried in the received packet, for example, based on a combination of packet fields, such as a PDU type field, a name field, and/or a metadata field, as described more fully below. For example, the flow matching sub-module 341 determines whether the received packet is an interest packet that carries a request from a consumer or a data packet that carries a data response from a producer (e.g., from a packet type field). Next, the flow matching sub-module 341 retrieves the name of the requested data object or the name of the data object carried in the packet (e.g., from a name field) and compares the name field against the name associated with the flow entries in the application flow table 320. If the name field matches, the flow matching sub-module 341 may further retrieve the security attributes, the context attributes, and/or the policies carried in the received packet (e.g., from a metadata field) and compare the metadata against the security attributes, the context attributes, and/or the policies associated with the flow entry that matches to the name field. The combination of packet fields employed for flow matching may vary for different application flows. For example, packets for a conferencing service or a mobile application may include additional fields, such as a source identifier (SID) and a destination identifier (DID), and the flow matching sub-module 341 may compare the SID and DID to the flow entries during flow matching.

When the flow matching sub-module 341 fails to match the received packet to the flow entries in the application flow table 320, the flow matching sub-module 341 may forward the received packet to the ICN controller, for example, via the ICN protocol processing module 310.

When the flow matching sub-module 341 finds a matching flow entry, the action sub-module 342 performs actions according to the flow rules stored in the matching flow entry. For example, when the packet is an ICN interest carrying a content request, the action sub-module 342 determines whether the CS in the ICN protocol processing module 310 caches the content requested by the interest. When the requested content is cached in the CS, the action sub-module 342 requests the ICN protocol processing module 310 to generate and transmit a data response packet in response to the interest according to the ICN protocol. When the content is not cached in the CS, the action sub-module 342 may aggregate the interest, forward the interest, or process the interest. The interest is aggregated when the ICN switch 300 previously received the same interest or a similar interest, for example, from another client and/or user, and stored the interest in the PIT. The interests are aggregated to avoid forwarding multiple copies of the interest. When the interest does not match any previously received interest stored in the PIT, the action sub-module 341 may forward the interest to the upstream producing point according to the forwarding path stored in the matching flow entry. The interest may also be forwarded to a local service, for example, the service module 330 or the ICN protocol processing module 310, or the ICN controller.

When the packet is an ICN data carrying a data response or content, the action sub-module 342 may perform several different actions according to the flow rules stored in the matching flow entry or the ICN protocol. For example, the action sub-module 342 may process the metadata carried in the data packet by invoking the service module 330 to check for security credentials, perform context adaptation or transcoding, check for policies compliance, cache the content in the CS of the ICN protocol processing module 310, forward the content to the ICN controller, and/or relay the content to a previous hop according to the forwarding path stored in the matching flow entry.

The flow monitor 343 is configured to measure and track statistics or monitor context changes when packets are received from the application flows over the ICN. The statistics may include application-level statistics that are semantically richer (e.g., associated with content or service metrics) than transport statistics. For example, the statistics may be content-specific or business-specific. The flow monitor 343 may measure and track different types of statistics based on the location (e.g., at an edge or a core network) of the ICN switch 300. An edge switch refers to a switch that is positioned at an edge of an access network and interfaces the access network to a core network, such as a provider core network or service network, whereas a core switch refers to a switch that is positioned within a core network. In an embodiment of an edge switch, the flow monitor 343 may measure content popularity and/or service popularity. For example, the content popularity measures may be employed for content orchestration and the number of service instances may be increased or decreased based on the service popularity measures. To monitor context changes, the flow monitor 343 may monitor changes in users, applications, and/or devices that request and/or receive content. For example, when the flow monitor 343 detects that a user moves to a different access point, the flow monitor 343 may update the ICN controller with the access point change information, and the ICN controller may redirect the application flow associated with the application in use by the user. Alternatively, when the flow monitor 343 detects that a user changes to a different device, the flow monitor 343 may determine the formats and/or capabilities associated with the user's device and may perform context adaptions accordingly when delivering content to the user.

In an embodiment of a core switch, the flow monitor 343 may measure statistics or metrics at a more aggregated-level than an edge switch. For example, the flow monitor 343 may measure the content or service provider popularity and may rank the content and/or service provider to enable dynamic business negotiations. It should be noted that the modules in the ICN switch 300 may be alternatively partitioned or configured as determined by a person of ordinary skill in the art to achieve the same functionalities.

Figure 4:
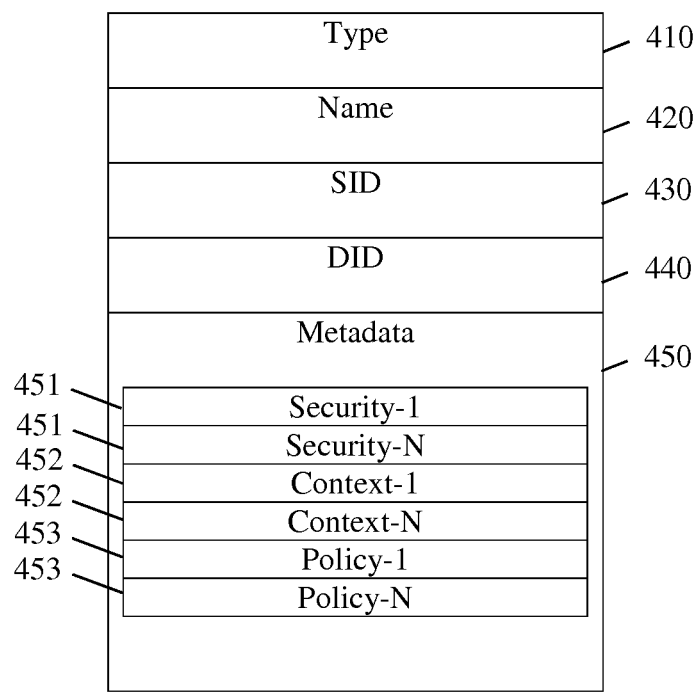
FIG. 4 is a schematic diagram of an embodiment of an ICN packet data unit (PDU).

FIG. 4 is a schematic diagram of an embodiment of an ICN PDU 400 as defined in the ICN protocol. The ICN PDU 400 is similar to the packets that are carried in the application flows in a software-defined ICN, such as the ICN 140. The ICN PDU 400 comprises a type field 410, a name field 420, a SID field 430, a DID field 440, and a metadata field 450, each comprising a variable length or other suitable size for carrying a corresponding field. The type field 410 indicates the packet type of the ICN PDU 400. For example, the type field 410 may indicate whether the ICN PDU 400 is an interest packet, a data packet, a put packet, or a get packet, where the interest and get packet are initiated by a consumer, and the data packet and the put packet are initiated by a producer. The name field 420 indicates the name of a content, a segment of a content, a service, and/or other attributes for use with selectors or exclusions. For example, the name field 420 may carry a hierarchical structured name. The SID field 430 indicates the name of the originator of the ICN PDU 400, where the name may include a service identifier, a content identifier, and/or a device identifier. The DID field 440 indicates the name of the destination of the ICN PDU 400, where the name may include a service identifier, a content identifier, and/or a device identifier. The SID field 430 and the DID field 440 are optional fields and may be included in point-to-point or host-to-host applications, such as conversational services or mobility applications, to improve efficiency.

The metadata field 450 comprises data and/or attributes associated with the content carried in the ICN PDU 400. For example, the metadata field 450 may comprise one or more security fields 451, one or more context fields 452, and one or more policy fields 453, each comprising a variable length or other suitable size for carrying corresponding data. The security fields 451 indicate security credentials, such as an encryption key, of a consumer or a producer or other network security attributes. The context fields 452 indicate context information, which may be associated with location, mobility, social context, or device context. The context information may be associated with various levels, such as network level, device level, or user level. The policy fields 453 indicate long term rules, which may be imposed by a consumer or a producer and may be associated with access controls or service scopes. It should be noted that the packet fields in the ICN PDU 400 are similar to the packet fields that are employed by an ICN switch, such as the ICN switch 130 or 300, during flow matching.

Figure 5:
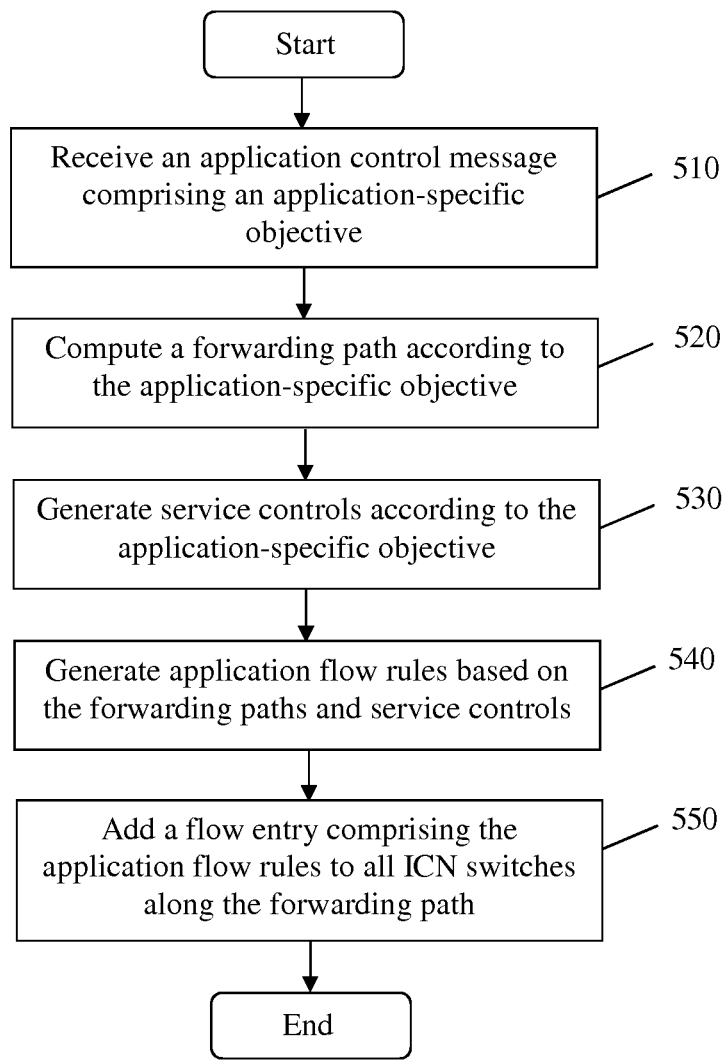
FIG. 5 is a flowchart of an embodiment of a method for configuring a software-defined ICN.

FIG. 5 is a flowchart of an embodiment of a method 500 for configuring a software-defined ICN, such as the ICN 140. The method 500 is implemented by an ICN controller, such as the ICN controller 120. The method 500 is employed during an initial configuration of the software-defined ICN and subsequent re-configuration to dynamically adapt to changes in the network, applications, and/or users. At step 510, an application control message comprising an application-specific objective is received, for example, from an application controller, such as the application controller 110. The application-specific objective may include security controls, context adaptations, policies, reliabilities, latencies, and costs for a particular application, such as the application 111, that delivers a service or a content in the ICN. At step 520, a forwarding path is computed across the ICN according to the application-specific objective. At step 530, service controls are generated according to the application-specific objective. At step 540, application flow rules are generated based on the forwarding paths and service controls. At step 550, a flow entry comprising the application flow rules is added to all ICN switches, such as the ICN switches 130 or 300, along the forwarding path, where the flow entry is associated with a name-based identifier (e.g., content name, service name, or application name). For example, the ICN controller may add the flow entry by sending a flow configuration message to each ICN switch along the forwarding paths.

Figure 6:
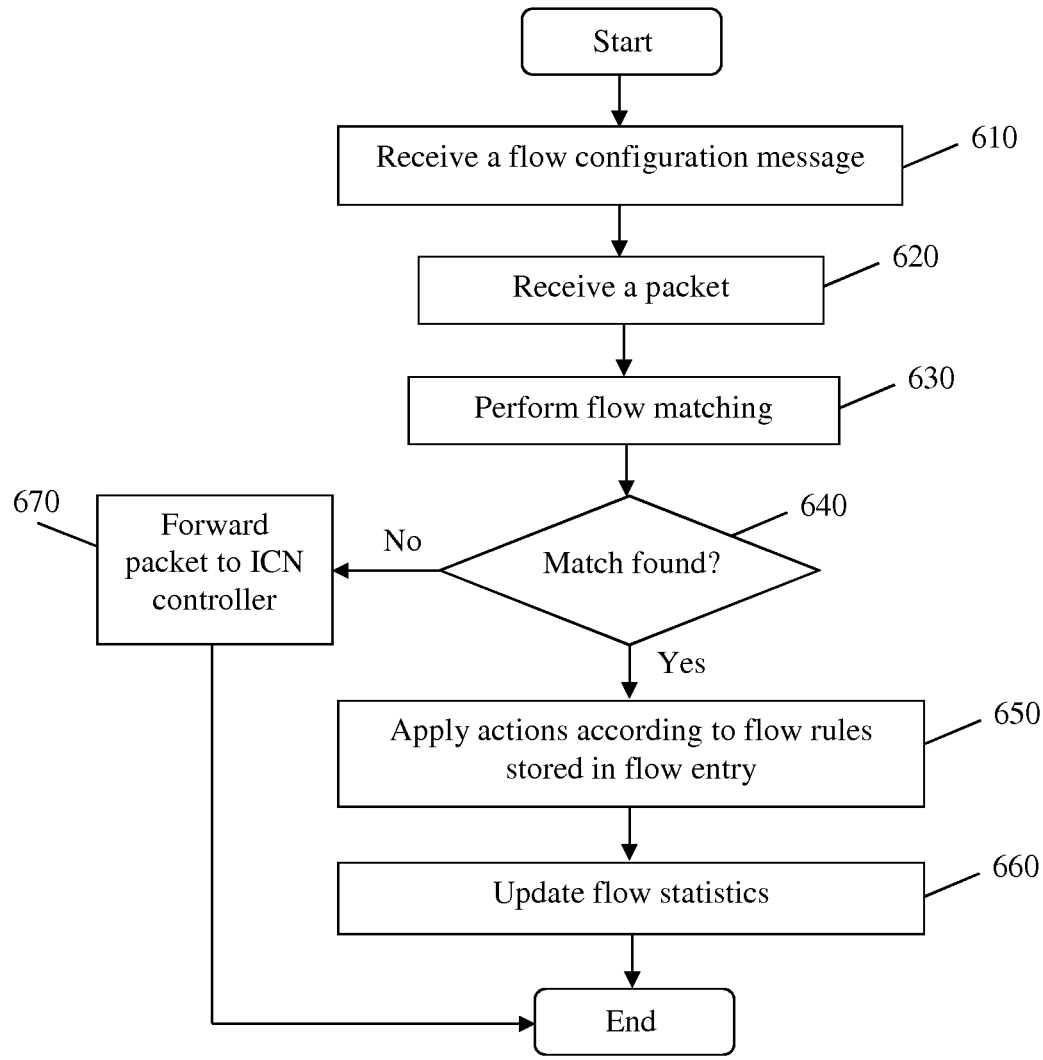
FIG. 6 is a flowchart of an embodiment of a method for performing switching functions in a software-defined ICN.

FIG. 6 is a flowchart of an embodiment of a method 600 for performing switching functions in a software-defined ICN, such as the ICN 140. The method 600 is implemented by a software-defined ICN switch, such as the ICN switch 130 or 300. The method 600 is employed during an initial configuration and subsequent operation of the software-defined ICN. At step 610, a flow configuration message is received, for example, from an ICN controller, such as the ICN controller 120. The flow configuration message comprises a flow entry that provides flow rules for an application flow, where the flow entry is associated with a name-based identifier corresponding to a particular application. For example, the flow rules may comprise data forwarding paths for delivering a service or a content for the particular application over the ICN and service controls associated with the application flow. The flow entry may be stored in an application flow table, such as the application flow table 320. At step 620, a packet is received, for example, from another ICN switch or other network element in the ICN. At step 630, a flow match is performed, for example, by comparing various combinations of the packet fields carried in the received packet to the flow entries in the application flow table as described above, where the packet fields may be substantially similar to the fields described in the ICN PDU 400. At step 640, a determination is made whether a match is found between the packet and the flow entries in the application flow table. If a match is not found in step 640, next at step 670, the packet is forwarded to the ICN controller. For example, the ICN controller may identify an application flow in the ICN for delivering the packet and add an additional flow entry for the application flow in the ICN switch. Alternatively, the ICN controller may request the ICN switch to discard the packet.

If a match is found in step 640, next at step 650, actions are applied according to the flow rules stored in the flow entry that matches the packet. Some example actions for a received interest may include forwarding a cached content when the content requested by the interest is cached, aggregating the interest in a PIT to avoid forwarding multiple copies of the interest, forwarding the interest to a next hop towards the producer of the content requested in the interest, processing the interest by a local service, or forwarding the interest to the ICN controller. Some example actions for a received data may include processing the metadata, such as security, context, etc., carried in the received data, caching the content in a CS, processing the content by a local service provided by the ICN switch, forwarding the content to the ICN controller, or relaying the content to a previous hop that requested the content. It should be noted that some of the actions may be associated with the ICN protocol and may be performed according to the ICN protocol.

At step 660, flow statistics are updated. The types of flow statistics may vary depending on the location of the ICN switch. For example, an edge switch may measure content popularity and/or service popularity and/or monitor content change, whereas a core switch may measure statistics at a more aggregated level, such as content provider popularity and/or service provider popularity.

Figure 7:
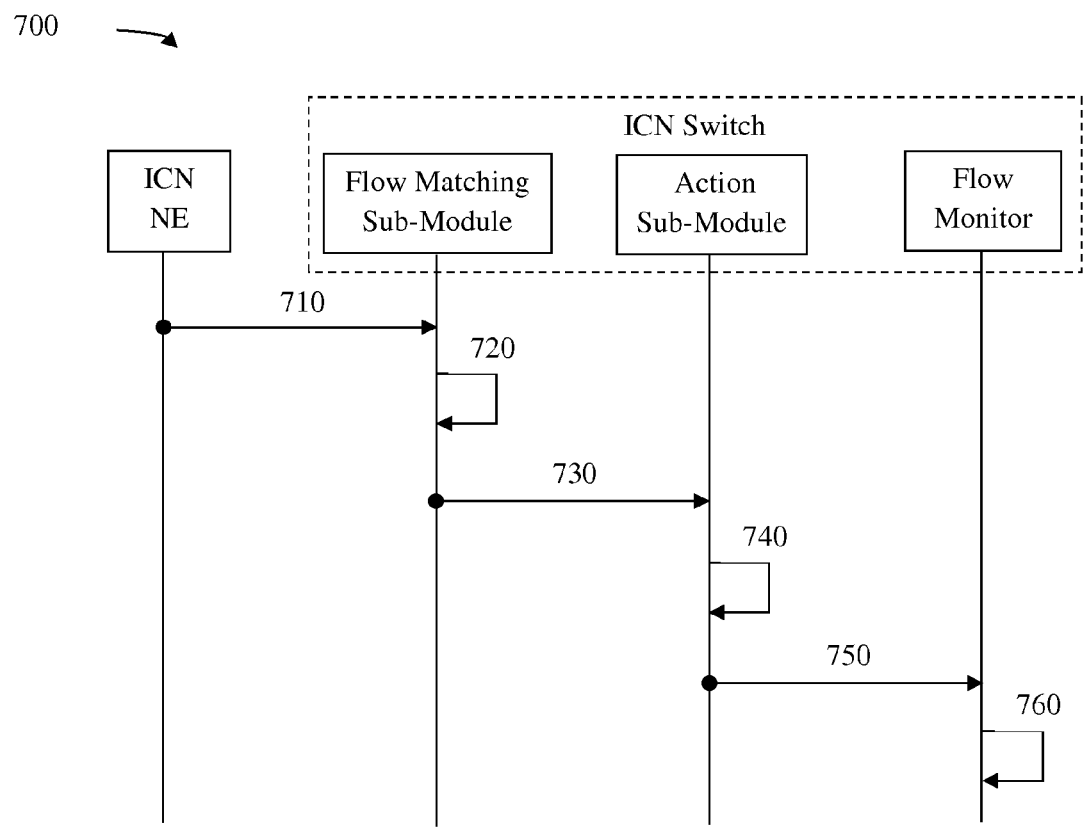
FIG. 7 is a protocol diagram of an embodiment of a method for performing switch functions in a software-defined ICN.

FIG. 7 is a protocol diagram of an embodiment of a method 700 for performing switching functions in a software-defined ICN, such as the ICN 140. The method 700 is implemented by a software-defined ICN switch, such as the ICN switch 130 or 300. The method 700 is employed during an initial configuration and subsequent operation of the software-defined ICN. The method 700 is similar to the method 600, and further illustrates ICN switch component interactions. For example, the ICN switch comprises a flow matching sub-module, such as the flow matching sub-module 341, an action sub-module, such as the action sub-module 342, and a flow monitor, such as the flow monitor 343. At step 710, the ICN switch receives a packet from an ICN NE, which may be another ICN switch or another NE in the ICN. The packet is substantially similar to the ICN PDU 400. At step 720, upon receiving the packet at the ICN switch, the flow matching sub-module performs flow matching to match the fields in the received packet to the flow entries stored in an application flow table, such as the application flow table 320. In some embodiments, the ICN switch may store multiple application flow tables, each specifying a set of fields for flow matching, and may perform flow matching in multiple steps. If a match is not found in the flow entries, the flow matching sub-module forwards the packet to an ICN controller, such as the ICN controller 120, and terminates the packet at the flow matching sub-module.

If a matching entry is found, next at step 730, the flow matching sub-module passes the packet processing controls to the action sub-module. At step 740, the action sub-module processes the packet according to the flow rules stored in the matching flow entry. The action sub-module may perform the actions in conjunction with other modules in the ICN switch. For example, when the received packet is an interest carrying a content request, the action sub-module may request an ICN protocol processing module, such as the ICN protocol processing module 310, to respond to the interest when the requested content is cached in the ICN switch. When the content is not cached, the action sub-module may request the ICN protocol processing module to aggregate the interest or forward the interest. The interest is aggregated when the ICN switch has previously received the same interest or a similar interest from another user and the interest stored in a PIT. When the interest is not already stored in the PIT, the action sub-module may request the ICN protocol processing module to forward the interest to an upstream producing point. Alternatively, the action sub-module may forward the interest to a service module, such as the service module 330, for security verifications, policy verifications, and/or context adaptations.

When the received packet is a data carrying a data response or content, the action sub-module may request the ICN protocol processing module to cache the content, process the metadata, or relay the data to a previous hop according to the flow rules stored in the matching entry. Alternatively, the action sub-module may forward the data to the service module for security verifications, policy verifications, and/or context adaptations.

After the action sub-module processes the packet, at step 750, the action sub-module passes the packet processing controls to the flow monitor. At step 760, the flow monitor updates counters or statistics for the identified flow. The following three embodiments describe the processing for various types of flows according to the method 700.

In a first embodiment, the packet received at step 710 may comprise a content request indicating an interest for a movie segment, name segment-Z, of a video, named video-Y, from a content provider, named content_provider-X as shown below:

ICN PDU: [Interest, /content_provider-X/video-Y/segment-Z].

In such an embodiment, the flow matching sub-module may search the flow entries based on the movie service name and the video name (e.g., /content_provider-X/video-Y) and then followed by the movie segment name (e.g., /content_provider-X/video-Y/segment-Z). The action sub-module may check whether the movie segment is cached in the ICN switch, for example, at a CS. If the movie segment is cached in the CS, the action sub-module may respond to the interest by sending the cached movie segment to the ICN NE. Otherwise, the action sub-module may forward the content request to the ICN controller. The flow monitor may update statistics as shown below:

Counter(/content_provider-X/video-Y)++ where the counter for the video-Y from the content_provider-X is incremented by one. For example, the counter may indicate a popularity measure for the video-Y from the content_provider-X.

In a second embodiment, the packet received at step 710 may comprise a service request indicating an interest for a service-X under a smart grid service category as shown below:

ICN PDU: [Interest, /smartgrid/service-X].

In such an embodiment, the flow matching sub-module may search the flow entries based on the service name and user metadata (e.g., /smartgrid/service-X:user-metadata). The action sub-module may check whether the smart grid service-X is hosted locally at the ICN switch. If the requested service is hosted locally at the ICN switch, the action sub-module may forward the service request to a service module, such as the service module 330. If the requested service is not hosted locally at the ICN switch, the action sub-module may forward the service request to the ICN controller. The flow monitor may update the statistics as shown below:

Counter(/smartgrid/service-X)++ where the counter for the service-X under the smart grid category is incremented by one. For example, the counter may indicate a popularity measure for the smart grid service-X. It should be noted that although content may be forwarded by any NEs in an ICN, a service is bounded to a particular point or NE in the ICN, and thus the service request is forwarded according to a particular flow associated with the service to reach the particular point or NE in the ICN.

In a third embodiment, the packet received at step 710 may comprise a content for a movie segment, named, name segment-Z, of a video, named video-Y, from a content provider, named content_provider-X as shown below:

ICN PDU: [Content, /content_provider-X/video-Y/segment-Z].

In such an embodiment, the flow matching sub-module may determine whether the video-Y is previously requested by a consumer, for example, by searching a PIT. If the PIT does not comprise an interest for the video-Y, the flow matching sub-module may forward the content to the ICN controller. If the PIT comprises an interest for the video-Y, the action sub-module may further process the metadata carried in the interest to determine whether the interest matches the received content. It the interest matches the received content, the action sub-module may forward the segment-Z in a reverse path associated with the interest, where the reverse path may refer to a receiving path of the interest in a reverse direction. Otherwise, the action sub-module may process the content locally. For example, the action sub-module may request a local service to perform context adaptation, such as transcoding, to convert the content into a format suitable for the device or the application that is to receive the content. The flow monitor may update statistics as shown below:

Counter(/content_provider-X/video-Y)++ where the counter for the video-Y from the content_provider-X is incremented by one. For example, the counter may indicate a popularity measure for the video-Y from the content_provider-X.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network controller comprising:
a receiver configured to receive an application control message from an application, wherein the application control message comprises an application-specific objective of the application, wherein the application-specific objective comprises a security control associated with the application or a policy associated with the application;
a processor configured to:
identify a flow between a network switch and the application in an information centric network (ICN) according to the application-specific objective, wherein the application is associated with an application name; and
generate a flow entry that comprises an identifier of the flow, wherein the identifier is based on the application name; and
a transmitter coupled to the processor and configured to send a flow configuration message to the network switch via the ICN,
wherein the flow configuration message comprises the flow entry.

2. The network controller of claim 1, wherein the processor is further configured to identify the flow by computing a data forwarding path in the ICN between the network switch and the application according to the application-specific objective.

3. The network controller of claim 1, wherein the application-specific objective further comprises at least one of a context associated with the application, a content caching rule associated with the application, or combinations thereof.

4. The network controller of claim 1, wherein the processor is further configured to identify the flow by identifying a service control according to the application-specific objective, and wherein the service control comprises at least one of a security control function corresponding to the application-specific objective's service control, a context processing function corresponding to the application-specific objective's context rule, a policy control function corresponding to the application-specific objective's policy, a content caching function corresponding to the application-specific objective's content caching rule, or combinations thereof.

5. The network controller of claim 1, wherein the receiver is configured to receive the application control message via an application control interface of the ICN.

6. A network element (NE) comprising:
a receiver configured to:
receive a flow configuration message from a network controller via an information centric network (ICN), wherein the flow configuration message comprises a flow entry that identifies a flow in the ICN, wherein the flow is based on an application-specific objective defined by an application, wherein the application-specific objective comprises a security control associated with the application or a policy associated with the application, wherein the flow entry comprises an identifier of the flow, wherein the identifier is based on a name of an application data object, and wherein the flow entry comprises a forwarding path associated with the application corresponding to the application data object name; and
receive a packet, via the ICN, comprising the application data object name;
a processor coupled to the receiver and configured to select the flow entry from a flow table based on the identifier of the flow; and
a transmitter coupled to the processor and configured to forward the packet along the forwarding path in the selected flow entry.

7. The NE of claim 6, wherein the packet further comprises an ICN protocol metadata that comprises a security attribute, a context attribute, a policy attribute, or combinations thereof, and wherein the processor is further configured to select the flow entry based on the ICN protocol metadata.

8. The NE of claim 6, wherein the flow entry comprises a security rule associated with the application data object, and wherein the processor is further configured to verify the packet according to the security rule.

9. The NE of claim 6, wherein the flow entry comprises a policy rule associated with the application data object, and wherein the processor is further configured to check the packet for policy compliance according to the policy rule.

10. The NE of claim 6, wherein the flow entry comprises a context rule associated with the application data object, and wherein the processor is further configured to process the packet according to the context rule.

11. The NE of claim 6, wherein the flow entry comprises a caching rule associated with the application data object, and wherein the processor is further configured to cache the packet according to the caching rule.

12. The NE of claim 6, wherein the processor is further configured to update an application-specific statistic associated with the application data object by incrementing a popularity counter that indicates a number of received packets associated with the application.

13. The NE of claim 6, wherein the processor is further configured to update an application-specific statistic associated with a provider that provides the application by incrementing a popularity counter that indicates a number of received packets associated with the provider.

14. The NE of claim 6, wherein the packet further comprises a metadata, wherein the processor is further configured to detect a context change by comparing the packet's metadata to flow entry's metadata, and wherein the context change comprises a content format change, a device capability change, a user capability change, an application capability change, or combinations thereof.

15. A method implemented in a network switch, comprising:
receiving a flow configuration message from a network controller via an information centric network (ICN), wherein the flow configuration message comprises a flow entry that identifies a flow in the ICN, wherein the flow is based on an application-specific objective defined by an application, wherein the application-specific objective comprises a security control associated with the application or a policy associated with the application, wherein the flow entry comprises an identifier of the flow, wherein the identifier is based on a name of an application data object, and wherein the flow entry comprises a forwarding path towards the application corresponding to the application data object name;
receiving an interest packet, via the ICN, comprising the application data object name;
selecting the flow entry from a flow table based on the identifier of the flow; and
forwarding the interest packet towards the application along the forwarding path in the selected flow entry.

16. The method of claim 15, wherein the interest packet comprises an ICN protocol metadata that comprises a security attribute, a context attribute, a policy attribute, or combinations thereof, and wherein the method further comprises selecting the flow entry based on the ICN protocol metadata.

17. The method of claim 15, wherein the interest packet indicates an interest for a service, and wherein the method further comprises:
   determining whether the service is hosted at the network switch;
   delivering the service when the service is hosted at the network switch; and
   forwarding the interest packet to the network controller when the service is not hosted at the network switch.

18. The method of claim 15, wherein the interest packet indicates an interest for a content and a first context associated with the content, and wherein the method further comprises:
   receiving the content via the ICN;
   determining whether the content is associated with a second context that matches the first context;
   processing the content according to the first context when the second context does not match the first context; and
   forwarding the content along a reverse path associated with the interest packet.

19. The method of claim 15, further comprising updating an application-specific statistic associated with the application by incrementing a popularity counter that indicates a number of received packets associated with the application.

20. The method of claim 15, further comprising updating an application-specific statistic associated with a provider that provides the application by incrementing a popularity counter that indicates a number of received packets associated with the provider.

* * * * *